(12) United States Patent
Kim et al.

(10) Patent No.: US 9,019,368 B2
(45) Date of Patent: Apr. 28, 2015

(54) SPATIAL PHASE SHIFTING INTERFEROMETER USING MULTI WAVELENGTH

(71) Applicants: Korea Research Institute of Standards and Science, Daejeon (KR); Micro Motion Technology Co., Ltd., Incheon (KR)

(72) Inventors: Jae Wan Kim, Daejeon (KR); Jong Ahn Kim, Daejeon (KR); Dong-Won Lee, Seoul (KR)

(73) Assignees: Korea Research Institute of Standards and Science, Daejeon (KR); Micro Motion Technology Co., Ltd., Incheon (KR)

( * ) Notice: Subject to any disclaimer, the term of this patent is extended or adjusted under 35 U.S.C. 154(b) by 327 days.

(21) Appl. No.: 13/667,467

(22) Filed: Nov. 2, 2012

(65) Prior Publication Data

US 2013/0113925 A1 May 9, 2013

(30) Foreign Application Priority Data

Nov. 4, 2011 (KR) ........................ 10-2011-0114643

(51) Int. Cl.
H04N 7/18 (2006.01)
G01B 9/02 (2006.01)

(52) U.S. Cl.
CPC ........ *G01B 9/02007* (2013.01); *G01B 9/02027* (2013.01); *G01B 9/02057* (2013.01); *G01B 2290/70* (2013.01); *G01B 9/02081* (2013.01); *G01B 2290/45* (2013.01)

(58) Field of Classification Search
USPC .......................................... 348/135; 359/341
IPC ....................................................... H04N 7/18
See application file for complete search history.

(56) References Cited

U.S. PATENT DOCUMENTS

| | | | | |
|---|---|---|---|---|
| 2001/0042410 A1* | 11/2001 | Ogawa | ............................ | 73/656 |
| 2007/0213618 A1* | 9/2007 | Li et al. | ......................... | 600/476 |
| 2009/0323076 A1* | 12/2009 | Li et al. | ......................... | 356/479 |
| 2013/0271765 A1* | 10/2013 | Couderc et al. | ............... | 356/402 |

FOREIGN PATENT DOCUMENTS

| | | |
|---|---|---|
| JP | 2003-227704 | 8/2003 |
| JP | 2008-504557 | 2/2008 |
| KR | 10-0916593 | 9/2009 |

* cited by examiner

*Primary Examiner* — Jay Patel
*Assistant Examiner* — Yulin Sun
(74) *Attorney, Agent, or Firm* — The Webb Law Firm

(57) ABSTRACT

Provided is a spatial phase shifting interferometer using a multi wavelength. More particularly, provided is a spatial phase shifting interferometer using a multi wavelength capable of more rapidly measuring a precise shape of a measurement object by simultaneously oscillating laser having different wavelengths and passing the oscillated laser through a beam splitter and a lens to analyze an interference fringe of the measurement object.

16 Claims, 5 Drawing Sheets

(a)  (b)

(c)

SPATIAL PHASE SHIFTING INTERFEROMETER USING MULTI WAVELENGTH

CROSS-REFERENCE TO RELATED APPLICATIONS

This application claims priority under 35 U.S.C. §119 to Korean Patent Application No. 10-2011-0114643, filed on Nov. 4, 2011, in the Korean Intellectual Property Office, the disclosure of which is incorporated herein by reference in its entirety.

TECHNICAL FIELD

The present invention relates to a spatial phase shifting interferometer using a multi wavelength. More particularly, the present invention relates to a spatial phase shifting interferometer using a multi wavelength capable of more rapidly measuring a precise shape of a measurement object by simultaneously oscillating a laser having different wavelengths and transmitting the oscillated laser through a beam splitter and a lens to analyze an interference fringe of the measurement object.

BACKGROUND

Recently, a demand for a micro three-dimensional measurement and inspection equipment has increased in laboratories or industries. In particular, with the increased tendency of miniaturization and high integration in a semiconductor production process, a demand for a three-dimensional inspection equipment that can measure a structure in a nano unit or less has rapidly increased. An electron microscope, an atomic force microscope, and the like, has been restrictively used due to a slow speed and therefore, a technology of optically measuring a shape like an interferometer has been mainly used widely in a production process. As representative optical shape measuring methods, there are a chase shifting interferometer, (hereinafter, referred to as PSI), a white-light scanning interferometer (hereinafter, referred to as WLSI), a confocal microscope, and the like.

Among the optical measuring methods, the PSI can measure a shape of a surface with a resolution within a nanometer, but may have a disadvantage in that a measurement region is limited to a ¼ wavelength height smaller than a 1 wavelength. Therefore, the PSI has been widely used in the case of measuring a smooth curved shape having a wide area like a surface of a mirror. FIG. 1 is a diagram for describing a method of measuring a shape of a surface by making up a Twyman-Green interferometer. Light oscillated in a light source 1 transmits a lens 2 and then, transmits a beam splitter 3 or is reflected therefrom. The transmitted light is incident to a reference mirror 4, the incident light is again reflected therefrom, and the reflected light is incident to the beam splitter 3. The light reflected from the beam splitter 3 is incident to a measurement object 5, the incident light is again reflected from the measurement object 4, and the reflected light is incident to the beam splitter 3. As such, the light again incident to the beam splitter 3 is re-transmitted or re-reflected to acquire an interference fringe image 6 under different phase conditions, phases Φ (x, y) at each point can be obtained by analyzing the interference fringe image 6, and the shape of the measurement object can be known by analyzing the obtained phases.

A basic principle of the interferometer splits a single light into two lights by a light splitter, wherein one of the two lights is used as a reference light and the remaining one is used as an object light, the object light reflected by inputting light to the measurement object interferes with the reference light to acquire the interference fringe, and the surface information of the measurement object is obtained by analyzing the interference fringe. In order to obtain the phases Φ (x, y), several sheets of images are required. Therefore, various methods for rapidly and accurately obtaining the phases F (x, y) have been proposed. As one of the methods, a method for obtaining a phase using a sheet of image has been proposed. The method has an advantage of more rapidly obtaining a phase than other methods requiring several sheets of images. However, when intending to measure a discontinuous surface of a step-like shape, the method has a common disadvantage of the PSI that the measurement region may be limited to a ¼ of a wavelength.

As a method for expanding the measurement region, a method for implementing a PSI using two or more wavelengths has been known. Generally, phase information is first obtained by measuring a shape using a single wavelength λ1 and is then obtained using a second wavelength λ2, thereby expanding the measurement region using two kinds of information. The method requires a minimum of double measurement time and therefore, a need exists for a new method for implementing a high-speed measurement.

SUMMARY

An embodiment of the present invention is to expand a measurement region and more rapidly measure a structure in a nano unit, by simultaneously measuring two kinds of phase information using two wavelengths.

In one general aspect, there is provided a spatial phase shifting interferometer using a multi wavelength including: a laser oscillator that oscillates a plurality of lasers having different wavelengths; a mode mixer that makes a coherence of laser wavelengths oscillated from the laser oscillator short; a first beam splitter that transmits and reflects the lasers emitted from the mode mixer and transmitting a lens and a linear polarizer; a Mirau lens unit that measures a measurement object by the lasers reflected from the first beam splitter; a wavelength demultiplexer that transmits the lasers reflected from the Mirau lens unit through the first beam splitter, the lasers transmitted from the first beam splitter through a quarter wave plate, and demultiplexes the lasers transmitting the quarter wave plate into more than two kinds of wavelengths; pixelated CCD camera whose number is correspondence to number of kinds of wavelength units that transmit wavelengths demultiplexed by the wavelength demultiplexer through a quarter wave plate to indicate an interference fringe; and a PC unit that analyzes a precise shape using the interference fringe in the pixelated CCD camera unit.

The lasers having different wavelengths may be collected as one by an optical fiber coupler and may be then incident to a multi-mode optical fiber and the coherence of the wavelengths of the lasers incident to the multi-mode optical fiber may be short by using a vibrator and the vibrator may be a speaker or a piezoelectric element. The Mirau lens unit may include an objective lens, a reference mirror disposed under the objective lens, a second beam splitter disposed under the reference mirror, and a quarter wave plate disposed under the second beam splitter and the lasers reflected from the first beam splitter may be incident through the objective lens and transmit through the second beam splitter and may be reflected therefrom and the quarter wave plate disposed under the second beam splitter may be configured so that a polarization of the laser reflected from the measurement object after transmitting the second beam splitter is vertical to a polarization of the laser reflected from the reference mirror. The Mirau lens unit may include an objective lens, a reference mirror disposed under the objective lens, a second beam splitter disposed under the reference mirror, and a quarter wave plate disposed above the second beam splitter and the lasers reflected from the first beam splitter may be incident through the objective lens and transmit through the second beam splitter and may be reflected therefrom and the quarter wave plate disposed above the second beam splitter may be configured so that a polarization of the laser reflected from the second beam splitter is vertical to a polarization of the laser reflected from the measurement object and a polarization of the laser reflected from the reference mirror. The wavelength demultiplexer may be a dichroic beam splitter or a color band pass filter.

In general aspect, there is provided a spatial phase shifting interferometer using a multi wavelength including: a laser oscillator that oscillates a plurality of lasers having different wavelengths; a mode mixer that makes a coherence laser wavelengths oscillated from the laser oscillator short; a polarizing beam splitter that transmits and reflects the lasers emitted from the mode mixer and transmitting a lens and a linear polarizer; a microscope in unit in which the lasers reflected from the polarizing beam splitter are incident to an measurement object, the lasers transmitting the polarizing beam splitter are incident to a reference mirror, and the polarizing beam splitter re-transmits and re-reflects the lasers reflected from the measurement object and the lasers reflected from the reference mirror; a wavelength demultiplexer that demultiplexes a part of the lasers re-transmitting the polarizing beam splitter and reflected from the polarizing beam splitter into more than two kinds of wavelengths; pixelated CCD camera whose number is correspondence to number of kinds of wavelength units that transmit wavelengths demultiplexed by the wavelength demultiplexer through a quarter wave plate to indicate an interference fringe; a PC unit that analyzes a precise shape using the interference fringe in the pixelated CCD camera unit.

The lasers having different wavelengths may be collected as one by an optical fiber coupler and may be then incident to a multi-mode optical fiber and the coherence of the wavelength of the lasers incident to the multi-mode optical fiber may be short by using a vibrator and the vibrator may be a speaker or a piezoelectric element. The microscope interferometer unit may include a quarter wave plate so that a polarization of the lasers reflected from the measurement object is vertical to a polarization of the lasers reflected from the reference mirror and the lasers reflected from the polarizing beam splitter and transmitting the polarizing beam splitter may transmit the quarter wave plate and the polarizing beam splitter may re-transmit and re-reflect the lasers reflected from the measurement object and the lasers reflected from the reference mirror and a part of the re-transmitted and re-reflected lasers may transmit an objective lens and the quarter wave plate and may be incident to the wavelength demultiplexer. The wavelength demultiplexer may be a dichroic beam splitter or a color band pass filter.

Other features and aspects will be apparent from the following detailed description, the drawings, and the claims.

DETAILED DESCRIPTION OF EMBODIMENTS

Figure 1:
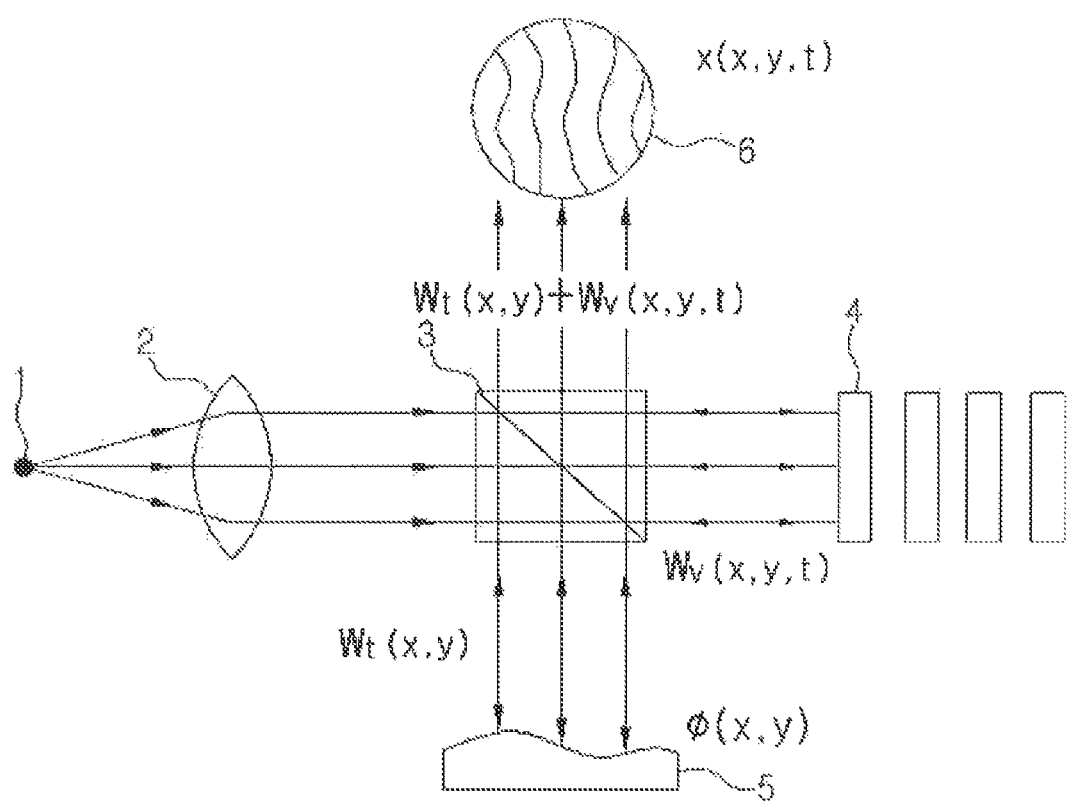
FIG. 1 is a diagram schematically illustrating an interferometer for describing a principle of the interferometer.

Hereinafter, a spatial phase shifting interferometer using a multi wavelength according to embodiments of the present invention will be described with in detail with reference to the accompanying drawings. The following introduced drawings are provided by way of example so as to fully convey an idea of the present invention to a person skilled in the art to which the present invention pertains. Therefore, the prevent invention is not limited to the drawings set forth below, and may be embodied in different forms, and the drawings set forth below may be exaggerated in order to clarify the spirit of the present invention. In addition, throughout the specification, like reference numerals denotes like components.

Here, unless indicated otherwise, the terms used in the specification including technical and scientific terms have the same meaning as those that are usually understood by those who skilled in the art to which the present invention pertains, and detailed description of the known functions and constitutions that may obscure the gist of the present invention will be omitted.

Figure 2:
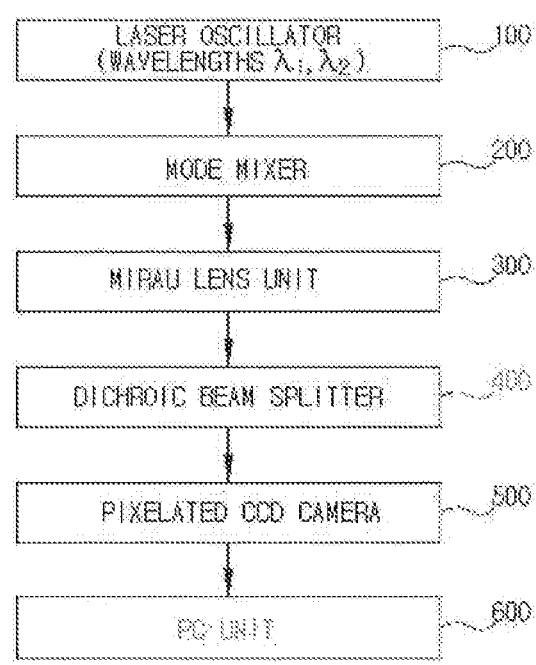
FIG. 2 is a configuration diagram of the interferometer according to an embodiment of the present invention.

A spatial phase shifting interferometer using a multi wavelength according to an embodiment of the present invention is operated by components as illustrated in FIG. 2. Referring to FIG. 2, a laser oscillator 100 oscillates laser having different wavelengths λ1 and λ2. The oscillated laser is collected in an optical fiber coupler through an optical fiber and is then incident to a single multi-mode optical fiber and the laser incident to the multi-mode optical fiber may make a coherence of the laser wavelength short by using a vibrator. As described above, a wavelength passes through a mode mixer 200 and a laser is incident to a Mirau lens unit 300, thereby measuring a measurement object. A wavelength of the laser reflected from the measurement object is demultiplexed by a dichroic beam splitter 400 that is a kind of a wavelength demultiplexer that is an apparatus of demultiplexing two wavelengths, the demultiplexed wavelengths each transmit a quarter wave plate and are incident to a pixilated CCD camera 500, and image information obtained by each camera is processed by a PC unit 600 and is converted to shape information.

Figure 3:
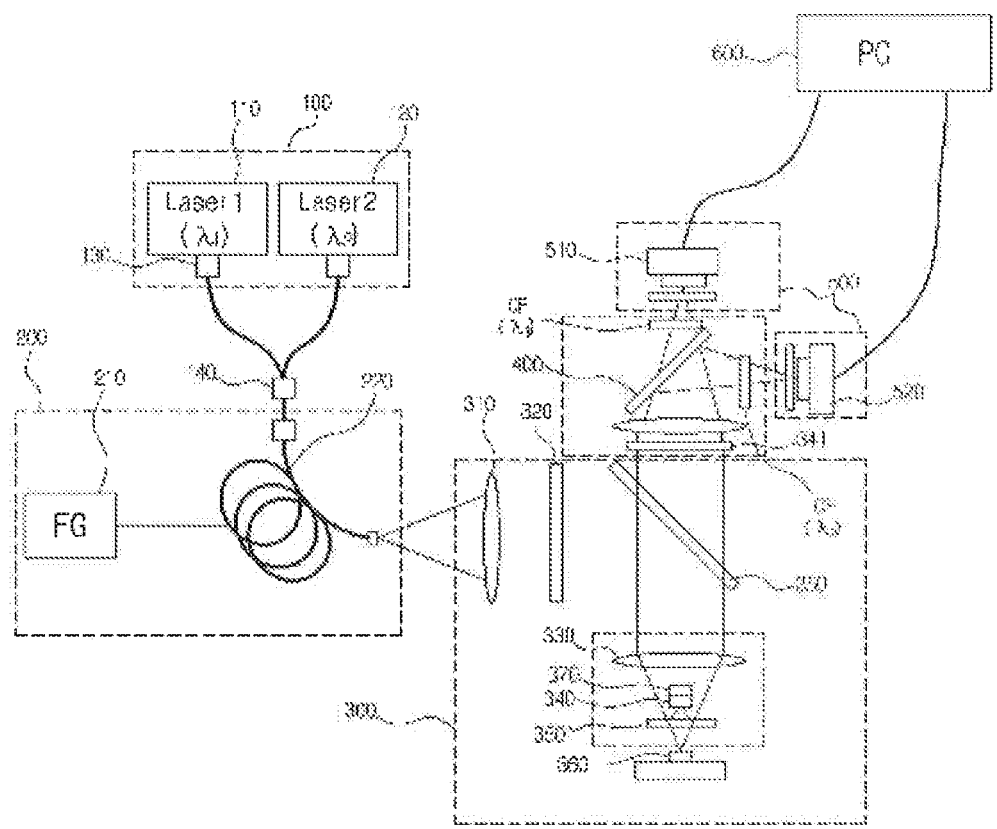
FIG. 3 is a diagram schematically illustrating the interferometer using a Mirau lens according to the embodiment of the present invention.

FIG. 3 is a diagram schematically illustrating the interferometer using a Mirau lens according to the embodiment of the present invention. Referring to FIG. 3, light emitted from two lasers 110 and 120 is incident to a multi-mode fiber 220 through a fiber collimating lens (FCL) 130 and an optical fiber coupler (OFC) 140. The multi-mode optical fiber 220 shakes the light at high speed using vibrators (for example, speaker, piezoelectric element, and the like) 210 to emit the light mixed with a mode therein. This process is to make a spatial coherence between a laser emitted from an output end of the multi-mode optical fiber 220 and a laser next thereto short. The laser emitted from the multi-mode optical fiber 220 transmits a first beam splitter 350 and is reflected therefrom via a collimation lens (CL) 310 a linear polarizer 320. The laser transmitting the first beam splitter 350 is divided into a reference beam and an inspection beam, wherein the reference beam is reflected from a second beam splitter 350' and transmits the quarter wave plate 340 twice, such that a polarization angle rotates 90° and forms an angle of 90° with respect to the inspection beam. When the laser transmits the quarter wave plate 341 via the first beam splitter 350, the reference beam and the inspection beam forming an angle of 90° each are circularly polarized in an opposite direction to each other. The inspection beam and the reference beam first use a laser having different wavelengths and therefore, the dichroic beam splitter 400 splits each laser first used, separately from the reference beam and the inspection beam. That is, the laser emitted from the multi-mode optical fiber 220 becomes a parallel beam by the collimation lens 310, wherein a polarization direction of the parallel light is controlled by the linear polarizer 320. The polarization direction of linear polarizer 320 combines with an axial direction of the quarter wave plate 340 in the modified Mirau lens, such that the polarization direction of light transmitting the quarter wave plate 340 twice rotates 90°. Therefore, the polarization direction of the linear polarizer 320 and the optical axis of the quarter wave plate need to be aligned while being interlocked with each other. The laser transmitting the linear polarizer 320 transmits the first beam splitter 350 and is reflected therefrom. Among them, the reflected laser transmits an objective lens 330 of the Mirau lens unit and is incident to a second beam splitter 350' of the Mirau lens unit. The reflecting and transmitting phenomenon of the laser also occurs in even in the second beam splitter 350'. Among them, the transmitted laser is incident to the surface of the measurement object 360 and the reflected laser is incident to a reference mirror 370. The laser incident to the reference mirror transmits the quarter wave plate 340 and is then reflected from the reference mirror 370, and transmits the quarter wave plate 340 again, such that the polarization rotates 90°. The laser is reflected from the second beam splitter 350' in the state in which the polarization rotates 90° and is incident to the objective lens 330 and is then incident to the first beam splitter 350. On the other hand, the laser transmitted to the surface of the measurement object 360 is reflected from the object surface and transmits the second beam splitter 350' without the change in polarization and is incident to the objective lens 330, and is then incident to the dichroic beam splitter 400. The dichroic beam splitter (DBS) 400 is an optical device that is coated to reflect a specific wavelength and transmit another wavelength. In order to demultiplex the wavelength, the dichroic beam splitter (DBS) or a color band pass filter (CF) transmitting only each wavelength may be used. The laser incident to the dichroic beam splitter 400 is split again by the dichroic beam splitter 400, the split lasers each form the interference fringe in two CCD cameras 510 and 520 that are a pixelated CCD camera unit 500, and the formed interference fringe of the pixelated CCD cameras 510 and 520 is analyzed by the PC 600 to measure the shape. When the quarter wave plate is disposed in front of the pixelated CCD camera unit 500, the laser transmits the quarter wave plate and is incident to the pixelated CCD camera unit 500.

Figure 4:
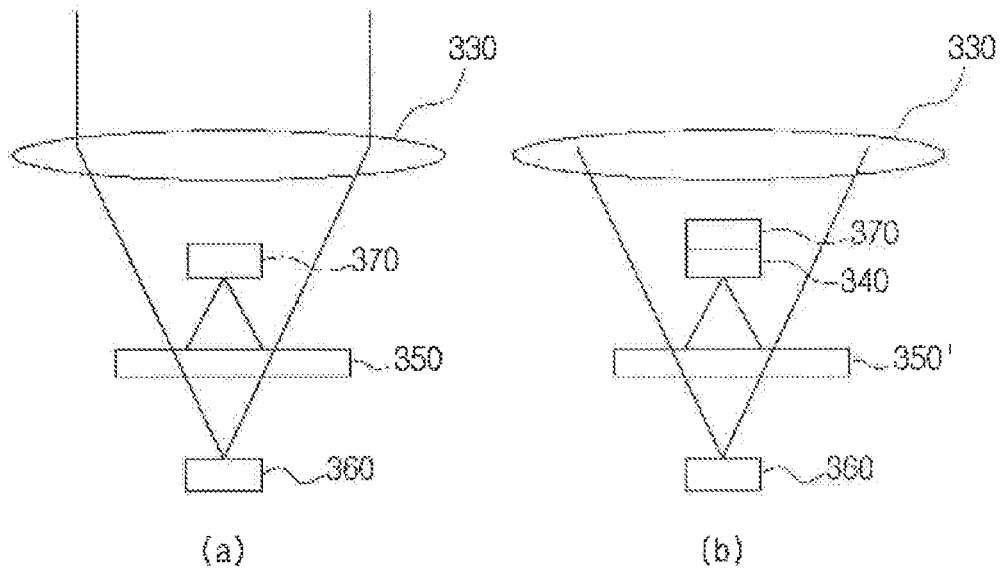
FIG. 4 is a diagram illustrating modified embodiment of the Mirau lens.
Figure 4:
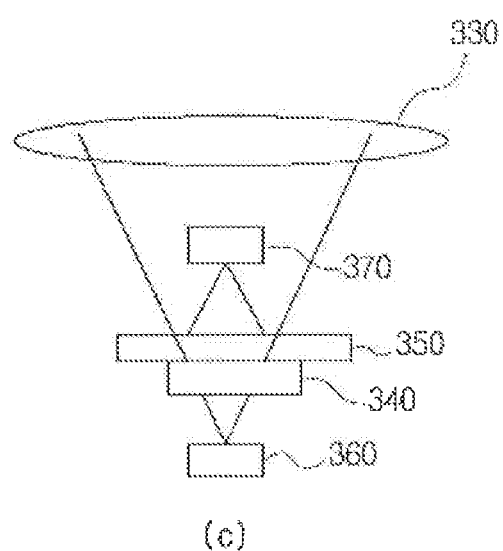

FIG. 4 is a diagram schematically illustrating a modified embodiment of the Mirau lens. FIG. 4A illustrates the existing Mirau lens structure and FIGS. 4B and 4C illustrate a modified Mirau lens structure according to the embodiment of the present invention. The modified Mirau lens structure includes the quarter wave plates (QWP) 340 and 340' above or under the second beam splitter 350' that is disposed under the reference mirror 370. The quarter wave plates 340 and 340' are configured so that the polarization of the laser reflected from the measurement object is vertical to the polarization or the laser reflected from the reference mirror 370.

Figure 5:
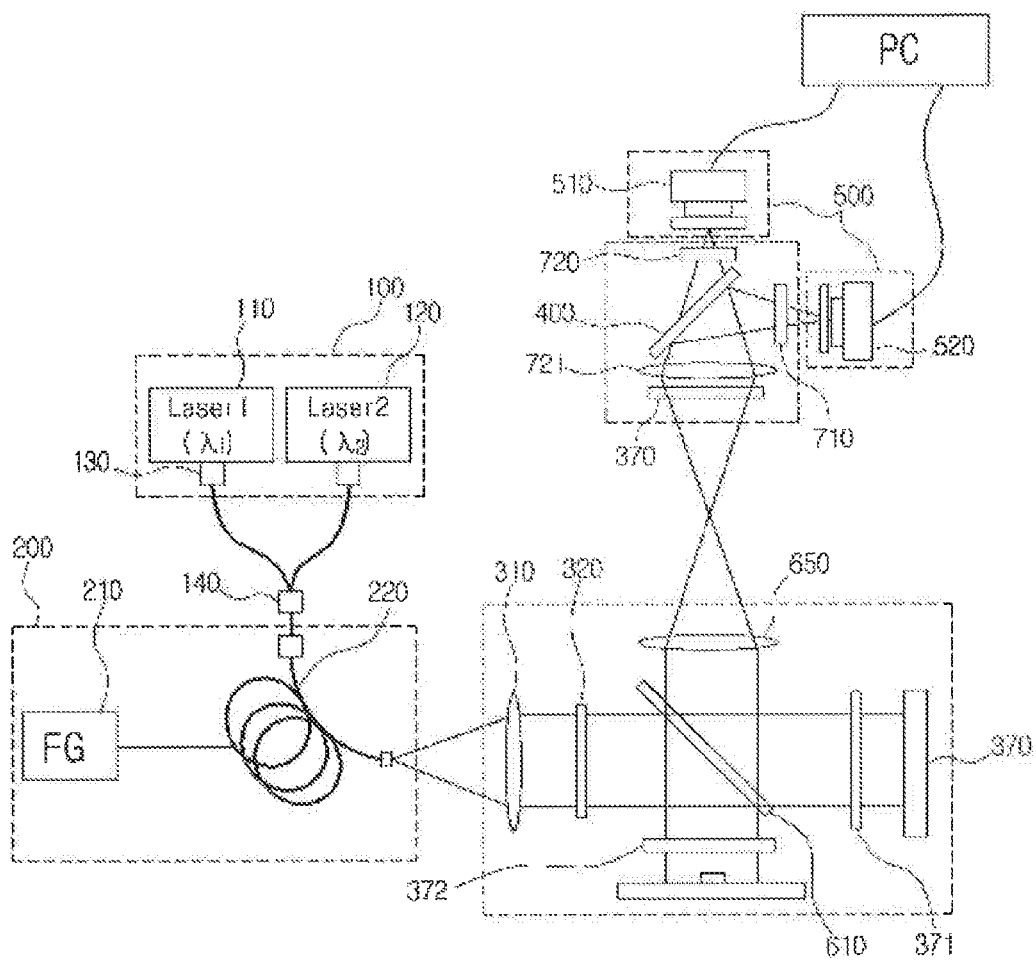
FIG. 5 is a diagram schematically illustrating an interferometer according to another embodiment of the present invention.

FIG. 5 is a diagram schematically illustrating an interferometer according to another embodiment of the present invention. Referring to FIG. 5, light emitted from the multi-mode optical fiber is formed into a parallel light by the collimation lens 310 and transmits again the linear polarizer 320 so as to control the polarization direction. The linear polarizer 320 controls the polarization direction so as to be 45° with respect to a polarizing axis of a polarizing beam splitter (PBS) 610. When light that is linearly polarized 45° with respect to the polarization axis is incident to the polarizing beam splitter 610, since the light is a synthesis of light of an x-axis component and a light of a y-axis component having the same amplitude with respect to the polarizing axis of the polarizing beam splitter 610, the lights of components vertical to each other having same amplitude are incident to the measurement object and the reference mirror 370, respectively. When each light is incident and reflected to and from the reference mirror 370 and the quarter wave plates 371 and 372 disposed in front of the measurement object, each light is vertically polarized to the first while transmitting the quarter wave plates twice in total. Therefore, each beam is again incident to the polarizing beam splitter 610 in the state in which the phases thereof are orthogonal to the first phase, the previously transmitted reference beam is reflected, and the previously reflected inspection beam is transmitted and is incident to the dichroic beam splitter 400 performing a wavelength demultiplexing function. That the laser incident to the polarizing beam splitter 610 is transmitted and reflected, the laser reflected from the polarizing beam splitter 610 is incident to the measurement object, and the laser transmitted from the polarizing beam splitter 610 is incident to the reference mirror 370. In this case, the laser incident to the reference mirror 370 transmits the quarter wave plate 371 twice to rotate the polarization direction 90°, such that the laser returns to the polarizing beam splitter 610 and is then reflected therefrom and is incident to the wavelength demultiplexer and the laser reflected from the polarizing beam splitter 610 and incident to the measurement object transmits the quarter wave plate 372 twice to rotate the polarization direction 90°, such that the laser returns to the polarizing beam splitter 610 and is then transmitted and is incident to the wavelength demultiplexer. In this case, the re-transmitted laser transmits the objective lens 650. The laser transmitting the objective lens 330 transmits the quarter wave plate 370 and an imaging lens 710 and then, the wavelength thereof is demultiplexed by the dichroic beam splitter (DBS) 400. The dichroic beam splitter (DBS) 400 is an optical device that is coated to reflect a specific wavelength and transmit another wavelength. In order to demultiplex the wavelength, dichroic beam splitter (DBS) or color band pass filters (CF) 720 and 721 transmitting only each wavelength may be used. The quarter wave plate 370 is required to operate the pixelated CCD camera, a pixelated phase mask is disposed in front of the CCD camera, and only the quarter wave plate is disposed in front of the pixelated phase mask. One pixel of the phase mask is configured of four sheets of arrays that are configured of polarizing plates of 0°, 45°, 90°, and −45°, respectively. In order to obtain the height information of one point in the PSI scheme, four interference signals are required when a phase difference is different, such that the pixelated phase mask is configured of micro pixels and four pixels configures a single array. The reference beam and the inspection beam are vertically polarized to each other while transmitting a microscope interferometer unit and therefore, are circularly polarized and split in an opposite direction to each other while transmitting the quarter wave plate, such that the reference beam and the inspection beam are each linearly polarized 0°, 45°, 90°, and −45°, and while being each circularly polarized and split in an opposite direction to each other while transmitting the phase mask.

In a intensity of light Equation of the interference signal, when a intensity of light of the reference beam is set to be $I_r$ and a intensity of light of the inspection beam is set to be $I_t$, $$I=I_r+I_t+2(I_tI_r)^{1/2}\cos[\Delta\Phi+2\alpha]$$

In the above Equation, $\Delta\Phi$ represents a phase difference between two beams and a represents a polarizing angle of each pixel. The signals that can be obtained from four arrays are as follows.

$$I_0=I_r+I_t+2(I_tI_r)^{1/2}\cos[\Delta\Phi]$$

$$I_1=I_r+I_t+2(I_tI_r)^{1/2}\cos[\Delta\Phi+\pi/2]$$

$$I_2=I_r+I_t+2(I_tI_r)^{1/2}\cos[\Delta\Phi+\pi]$$

$$I_3=I_r+I_t+2(I_tI_r)^{1/2}\cos[\Delta+\Phi 3\pi/2]$$

In the above Equations, $I_t$, $I_r$, and $\Delta\Phi$ values can be arithmetically calculated based on four signals, when the signals obtained from two CCD cameras are analyzed, a beat wavelength can be calculated, and a shape in a range expanded by the wavelength can be measured.

When the moving object is measured by the interferometer, the error of measurement occurs and the measurement cannot be performed at all. Therefore, the object and the microscope interferometer need to be maintained in the stopped state during the obtaining of the shape information. Since the existing interferometer requires a long measurement time, it takes much time to move or stop an object.

However, the apparatus according to the present invention can simultaneously obtain the data required to measure the shape, such that the time required to measure one screen is required as much as the exposure time of the CCD camera. Since the exposure time of the camera is short by several ms or several µs, it seems like that the measurement object stops even though the measurement object slowly moves for the time required to measure the shape. Therefore, the method of moving a measurement object at the time of the measurement while being insensitive to the external vibrations is performed more freely, as compared to the existing interferometer. The characteristic can more improve productivity when the present invention is applied to the production line, as compared to the existing method.

As described above, the present invention is described with reference to specific matters such as the detailed components and the limited exemplary embodiments, but is provided to help a general understanding of the present invention. Therefore, the present invention is not limited to the above exemplary embodiments and can be variously changed and modified from the description by a person skilled in the art to which the present invention pertain.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A spatial phase shifting interferometer using a multi wavelength, comprising:
   a laser oscillator that oscillates a plurality of lasers having different wavelengths;
   a first beam splitter that transmits and reflects the lasers emitted from the laser oscillator and transmitting a lens;
   a Mirau lens unit that measures a measurement object by the lasers reflected from the first beam splitter;
   a wavelength demultiplexer that transmits the lasers reflected from the Mirau lens unit through the first beam splitter, the lasers transmitted from the first beam splitter through a quarter wave plate, and demultiplexes the lasers transmitting the quarter wave plate into more than two kinds of wavelengths;
   pixelated CCD camera whose number is correspondence to number of kinds of wavelength units that transmit the wavelengths demultiplexed by the wavelength demultiplexer through a pixelated polarizer to indicate an interference fringe; and
   a PC unit that uses the interference fringe in the pixelated CCD camera unit to analyze a precise shape.

2. The spatial phase shifting interferometer using a multi wavelength of claim 1, wherein the laser oscillator includes a mode mixer that makes a coherence of the oscillated lasers wavelengths short.

3. The spatial phase shifting interferometer using a multi wavelength of claim 1, wherein the first beam splitter includes a linear polarizer.

4. The spatial phase shifting interferometer using a multi wavelength of claim 1, wherein the lasers having different wavelengths are collected as one by an optical fiber coupler and are then incident to a multi-mode optical fiber and the coherence of the wavelength of the lasers incident to the multi-mode optical fiber is short by using a vibrator.

5. The spatial phase shifting interferometer using a multi wavelength of claim 4, wherein the vibrator is a speaker or a piezoelectric element.

6. The spatial phase shifting using a multi wavelength of claim 1, wherein the Mirau lens unit includes an objective lens, a reference mirror disposed under the objective lens, a second beam splitter disposed under the reference mirror, and a quarter wave plate disposed under the second beam splitter and the lasers reflected from the first beam splitter are incident through the objective lens and transmit through the second beam splitter and are reflected therefrom, and
   the quarter wave plate disposed under the second beam splitter is configured so that a polarization of the laser reflected from the measurement object after transmitting the second beam splitter is vertical to a polarization of the laser reflected from the reference mirror.

7. The spatial phase shifting interferometer using a multi wavelength of claim 1, wherein the Mirau lens unit includes an objective lens, a reference mirror disposed under the objective lens, a second beam splitter disposed under the reference mirror, and a quarter wave plate disposed above the second beam splitter and the lasers reflected from the first beam splitter are incident through the objective lens and transmit through the second beam splitter and are reflected therefrom, and
   the quarter wave plate disposed above the second beam splitter is configured so that a polarization of the laser reflected from the measurement object after transmitting the second beam splitter is vertical to a polarization of the laser reflected from the reference mirror.

8. The spatial phase shifting interferometer using a multi wavelength of claim 1, wherein the wavelength demultiplexer is a dichroic beam splitter or a color band pass filter.

9. A spatial phase shifting interferometer using a multi wavelength, comprising:
   a laser oscillator that oscillates a plurality of lasers having different wavelengths;

a polarizing beam splitter that transmits and reflects the lasers emitted from the laser oscillator and transmitting a lens;

a microscope interferometer unit in which the lasers reflected from the polarizing beam splitter are incident to an measurement object, the lasers transmitting the polarizing beam splitter are incident to a reference mirror, and the polarizing beam splitter re-transmits and re-reflects the lasers reflected from the measurement object and the lasers reflected from the reference mirror;

a wavelength demultiplexer which transmits the lasers re-transmitting the polarizing beam splitter and reflected therefrom through the quarter wave plate and splits the lasers transmitting the quarter wave plate into more than two kinds of wavelengths;

pixelated CCD camera whose number is correspondence to number of kinds of wavelength units that transmit the wavelengths demultiplexed by the wavelength demultiplexer through a pixelated polarizer to indicate an interference fringe; and a PC unit that uses the interference fringe in the pixelated CCD camera unit to analyze a precise shape.

10. The spatial phase shifting interferometer using a multi wavelength of claim 9, wherein the laser oscillator includes a mode mixer that makes a coherence of the oscillated laser wavelengths short.

11. The spatial phase shifting interferometer using a multi wavelength of claim 9, wherein the polarizing beam splitter includes a linear polarizer.

12. The spatial phase shifting interferometer using a multi wavelength of claim 9, wherein the lasers having different wavelengths are collected as one by an optical fiber coupler and are then incident to a multi-mode optical fiber and the coherence of the wavelengths of the lasers incident to the multi-mode optical fiber is short by using a vibrator.

13. The spatial phase shifting interferometer using a multi wavelength of claim 12, wherein the vibrator is a speaker or a piezoelectric element.

14. The spatial phase shifting interferometer using a multi wavelength of claim 9, wherein the microscope interferometer unit includes a quarter wave plate so that a polarization of the lasers reflected from the measurement object is vertical to a polarization of the lasers reflected from the reference mirror and the lasers reflected from the polarizing beam splitter and transmitting the polarizing beam splitter transmit the quarter wave plate.

15. The spatial phase shifting interferometer using a multi wavelength of claim 9, wherein the polarizing beam splitter re-transmits and re-reflects the lasers reflected from the measurement object and the lasers reflected from the reference mirror and a part of the re-transmitted and re-reflected lasers transmits an objective lens and the quarter wave plate and is incident to the wavelength demultiplexer.

16. The spatial phase shifting interferometer using a multi wavelength of claim 9, wherein the wavelength demultiplexer is a dichroic beam splitter or a color band pass filter.

* * * * *